Figure 1:
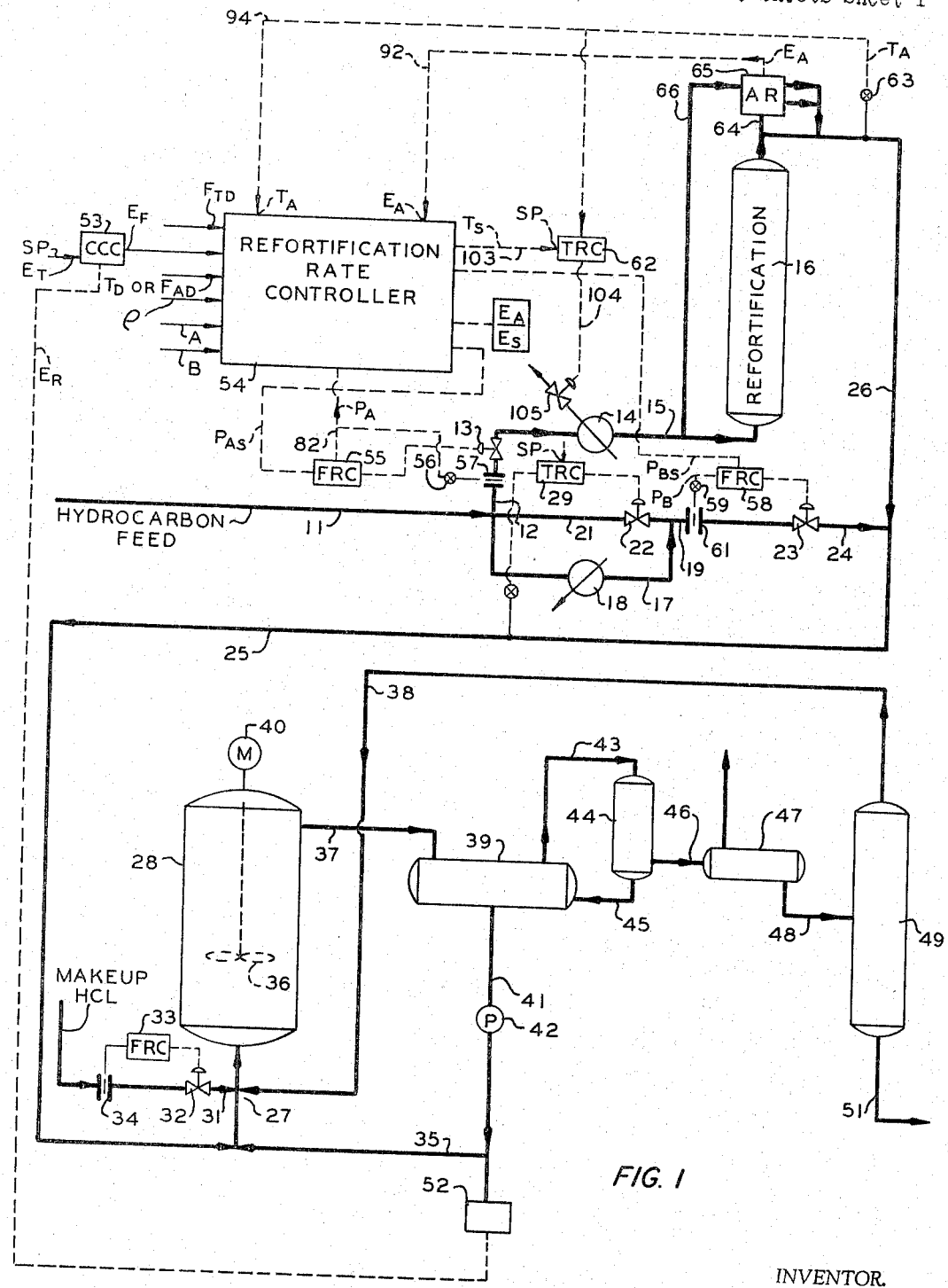

INVENTOR.
G. L. GLAHN

INVENTOR.
G. L. GLAHN

United States Patent Office 3,316,322
Patented Apr. 25, 1967

3,316,322
CONTROL OF CATALYST CONCENTRATION
Gerald L. Glahn, Bartlesville, Okla., assignor to Phillips Petroleum Company, a corporation of Delaware
Filed Sept. 28, 1962, Ser. No. 226,831
7 Claims. (Cl. 260—683.65)

This invention relates to method and apparatus for controlling the rate of addition of catalyst to a process. In one aspect the invention relates to the control of catalyst refortification in a process. In another aspect the invention relates to the control of the rate of catalyst refortification in a process, such as an alkylation or isomerization process. In another aspect the invention relates to method and apparatus for controlling the relative proportion of catalyst and reactant in a reaction zone.

Catalysts which are particularly suitable for utilization in carrying out processes such as isomerization and alkylation comprise metal halides, such as aluminum chloride, aluminum bromide, boron trifluoride, and the halides of metals such as zinc, tin, arsenic, antimony, zirconium, beryllium, titanium, iron, and the like. The catalysts are especially effective when present as complexes which are formed by interaction between the metal halides and hydrocarbons present in the reaction system. A particularly desirable isomerization catalyst is the complex of hydrocarbons with aluminum chloride. Such catalysts are often utilized in combination with a promoter which is preferably the hydrogen halide corresponding to the metal halide catalyst.

With continued use, the catalyst complex gradually loses its activity and it is common practice in the art to "fortify" it with fresh metal halide and/or additional promoter to revive its catalytic properties. One commonly used method of refortification is the utilization of a refortification column having a plurality of inputs positioned at various levels in the column with the hydrocarbon feed entry being periodically changed to the next lower input. This results in the addition of a slug of catalyst into the system. The slug enters the reactor, is mixed with the catalyst complex and reaction hydrocarbons therein, and leaves the reactor with other reactor effluent to enter the settler. The slug is incorporated into the catalyst complex which is recovered from the settler and is recirculated to the reactor. The surge in concentration of the catalyst in the reactor effluent results in a surge in losses of the catalyst with the hydrocarbon phase from the settler. A significant portion of these losses passes through the coalescer and the HCl stripper and into the caustic wash system where it is neutralized resulting not only in a loss of catalyst but also a waste of neutralizing material. While the existence of the problem of controlling catalyst activity and inventory has been generally recognized, most of the proposed solutions have involved long and complicated analytical procedures.

It has now been discovered that a correlation exists between the refractive index of a hydrocarbon solution of metal halide catalyst and the concentration of catalyst in the hydrocarbon. It has further been discovered that the rate of addition of catalyst to a reactant feed stream can be controlled where the catalyst is partially soluble in the reactant feed by passing a portion of the feed stream into contact with the catalyst and manipulating the temperature and/or the rate of flow of said portion responsive to the desired rate of addition of catalyst.

Accordingly, it is an object of the invention to provide novel method and means for controlling the rate of addition of catalyst to a process. Another object of the invention is to provide method and means for controlling the rate of refortification of a catalyst complex. Another object of the invention is to maintain a desired catalyst activity and inventory. A still further object of the invention is to provide for the efficient utilization of catalyst in a process.

Other objects, aspects, and advantages of the invention will be apparent from a study of the disclosure, the drawings and the appended claims to the invention.

Figure 2:
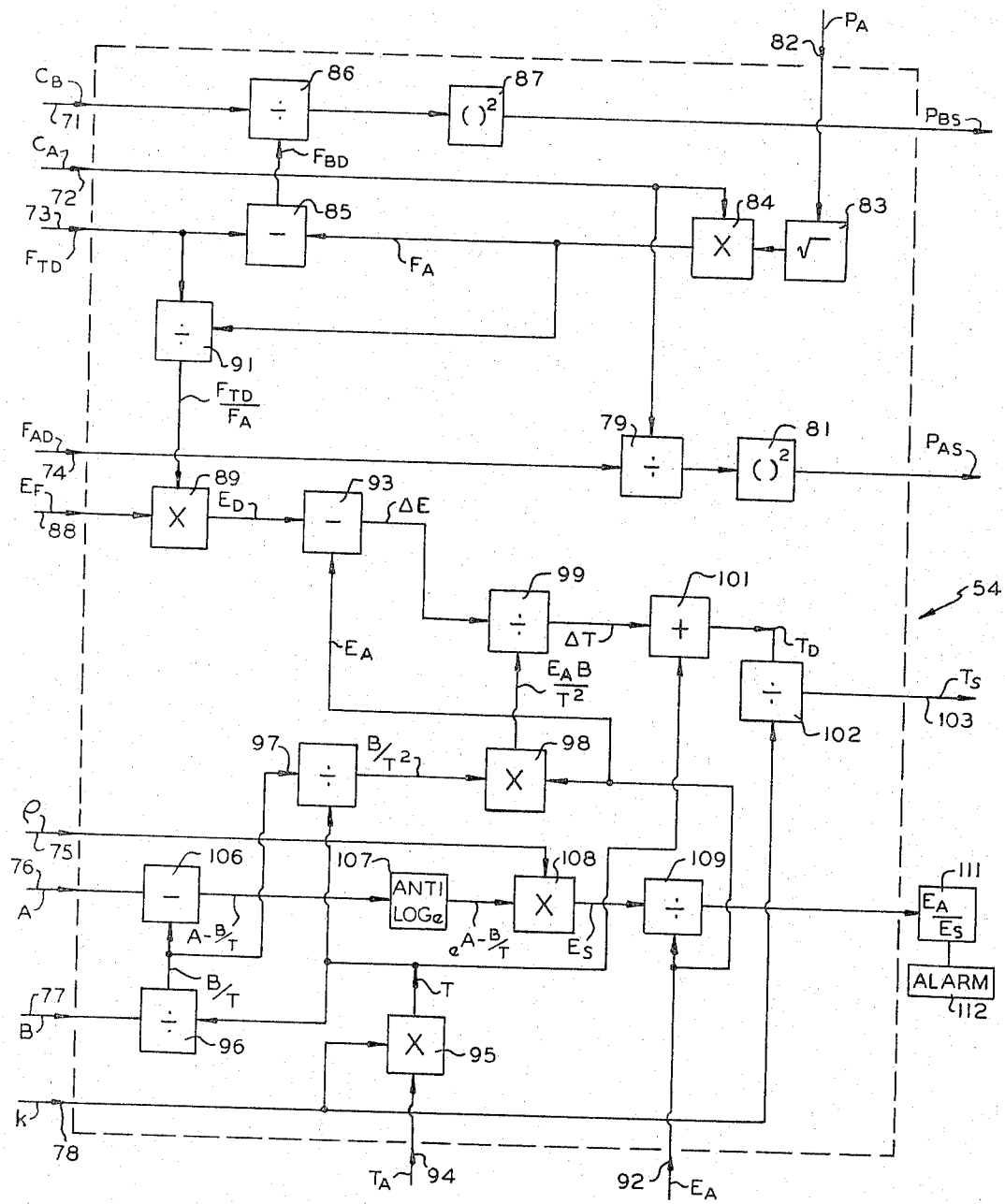
Figure 3:
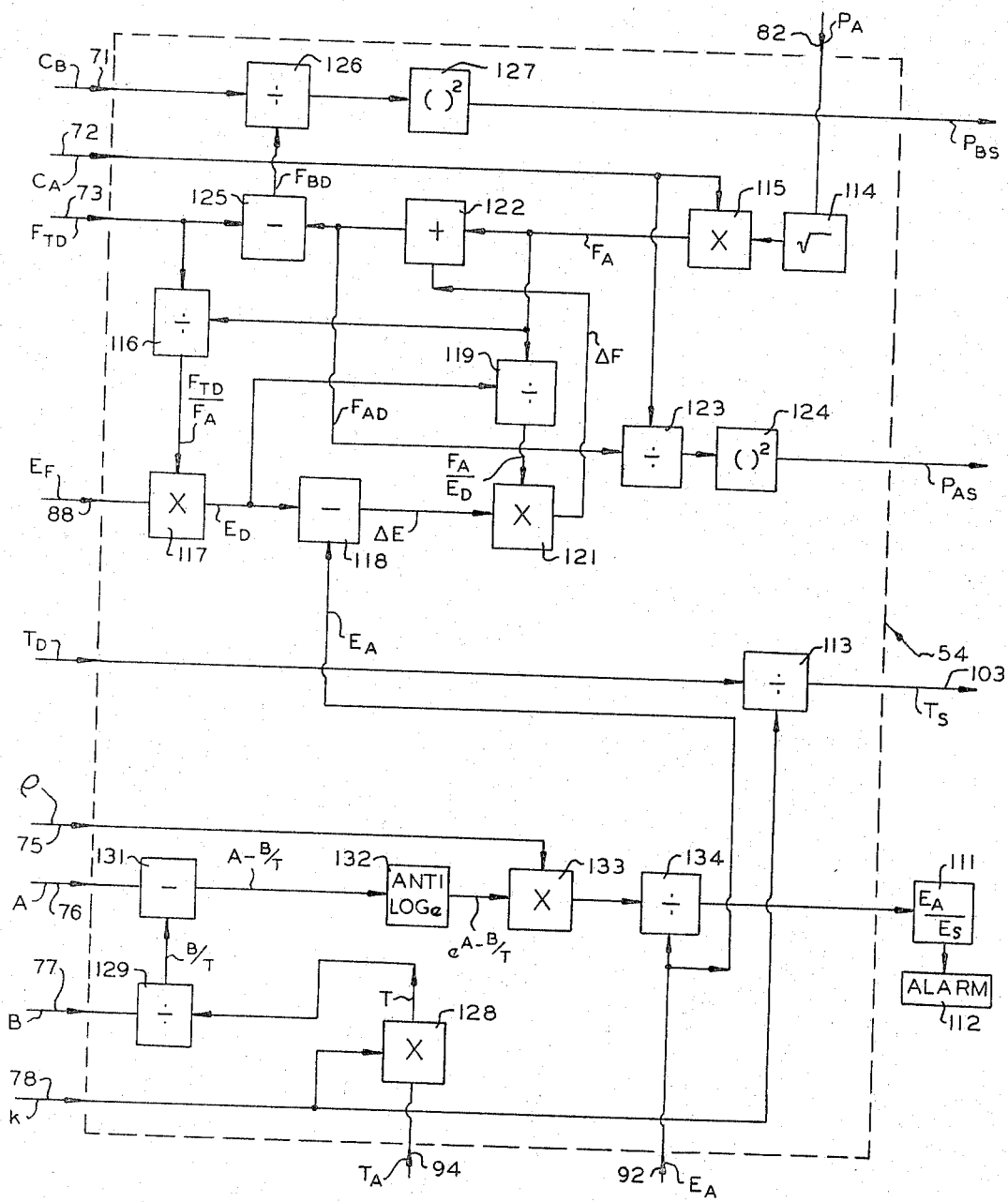

In the drawings, FIGURE 1 is a diagrammatic representation of an isomerization process embodying the invention, FIGURE 2 is a diagrammatic representation of a first embodiment of the refortification rate controller in the system of FIGURE 1, and FIGURE 3 is a diagrammatic representation of a second embodiment of the refortification rate controller in the system of FIGURE 1.

A wide variety of hydrocarbons can be converted in the isomerization reaction. For example, straight chain paraffins, such as butane, pentane, hexane, heptane, and higher molecular weight compounds, can be converted to various isomers in accordance with thermodynamically dictated equilibrium considerations. Also, moderately branched paraffins can be converted to more highly branched materials. For example, 2-methylpentane can be converted to 2,2- and 2,3-dimethylbutane. It is also possible to isomerize cycloparaffinic hydrocarbons having 5, 6, 7 and more carbon atoms in the rings. For example, methylcyclopentane can be converted to cyclohexane, 1,1-dimethylcyclobutane to methylcyclopentane, 1,2-dimethylcyclopentane to methylcyclohexane, etc. The isomerization reaction is usually carried out at temperatures between about 25° C. and about 400° C. at pressures from one atmosphere to 1000 p.s.i. or higher, and at liquid hourly space velocities from about 0.1 to about 20 cubic feet or liquid feed per cubic foot of catalyst per hour.

The isomerization of normal acyclic and substituted alicyclic hydrocarbons, such as normal hexane and methylcyclopentane, is carried out usually at a temperature in the range of between about 90° F. and about 160° F. The reaction is preferably carried out under sufficient pressure to provide a liquid phase reaction, namely, a pressure in the range of between about 150 and about 300 p.s.i.g. The contact or residence time of the reactants in the reactor varies, usually between about 0.1 and about 5 hours. In addition to the catalyst it is desirable that the corresponding hydrogen halide be present in the reaction zone since this material maintains catalyst activity at a high level.

For purposes of illustration, the invention will be described in terms of a catalyst system utilizing aluminum chloride and hydrogen chloride, but is obviously not to be limited thereto. Thus the reaction rate and the conversion of the hydrocarbon feed is dependent upon the amount of aluminum chloride in the aluminum chloride-hydrocarbon complex. For example, to maintain a normal hexane conversion of about 55 percent, the catalyst complex should contain 60 to 65 percent aluminum chloride. However, the quantity of aluminum chloride in the complex can be varied over wide ranges to provide a corresponding range of feed reactant conversion. While the overall activity of the catalyst is established by the aluminum chloride content as stated, the presence of hydrogen chloride is required to provide a high activity. Usually the quantity of hydrogen chloride present is between about 2 and about 6 weight percent of the feed with about 4 weight percent being preferred. The hydrocarbon-to-catalyst ratio is also an important factor in the isomerization reaction rate, and generally this ratio is maintained between about 0.8:1 and about 1.4:1, although ratios as high as 5:1 can be used if reaction temperatures are increased.

Referring now to the drawings and to FIGURE 1 in articular, hydrocarbon feed comprising normal hexane and methylcyclopentane and containing some isohexanes, cyclohexane, and other materials is passed through line 1. A first portion of the hydrocarbon feed from line 11 is passed by way of line 12, valve 13, heating unit 14 and line 15 into refortification chamber 16. A second portion of the hydrocarbon feed from line 11 is passed through line 17 and cooling unit 18 into line 19 wherein it is admixed with the remaining portion of the hydrocarbon feed which is passed through line 21 and valve 22 into line 19. The hydrocarbon feed in line 19 is passed through valve 23 and line 24 into line 25 wherein it is admixed with the solution of aluminum chloride in hydrocarbon feed which is withdrawn from refortification chamber 16 and introduced into line 25 by way of line 26. Suitable means, such as a filter screen (not shown), can be provided in refortification chamber 16 to prevent the entrainment of catalyst particles in the solution of catalyst in hydrocarbon feed being withdrawn by way of line 26. The resulting catalyst-fortified hydrocarbon feed is introduced by way of line 27 into isomerization reactor 28 which is maintained at a suitable temperature, such as about 140° F., and at a suitable pressure, such as about 150 p.s.i.g. As it is desirable that the temperature of the catalyst-fortified hydrocarbon feed being introduced into reactor 28 be maintained substantially constant at a predetermined suitable value for the purpose of regulating the temperature of reactor 28, valve 22 can be manipulated by temperature controller 29 responsive to the temperature of the material in line 25 to vary the amount of hydrocarbon feed being bypassed around cooling unit 18 by way of line 21 and valve 22. While the system has been illustrated through the utilization of two flow paths, lines 17 and 21, it is within the contemplation of the invention to omit the bypass line 21 and to regulate the cooling capacity of cooling unit 18 responsive to the temperature of the material in line 25. Recycled hydrogen chloride is introduced into reactor 28 by way of lines 38 and 27, while makeup hydrogen chloride is introduced into reactor 28 by way of line 31, valve 32, and line 27. The rate of addition of makeup hydrogen chloride can be controlled by flow rate controller 33 which manipulates valve 32 responsive to the differential pressure across an orifice 34 located in line 31. Recycled catalyst complex is introduced into reactor 28 by way of lines 35 and 27. Agitation and mixing is desirable during the reaction and this can be provided by a mixer 36 which is driven by a motor 40. The reaction effluent, comprising unreacted feed, reaction products, catalyst complex, and hydrogen chloride, is withdrawn from the reactor 28 and passed through line 37 into settler 39. In settler 39 the major portion of the catalyst complex is separated and withdrawn through line 41 and pump 42 for reintroduction into reactor 28 by way of lines 35 and 27. The remaining hydrocarbon phase portion of the reaction effluent is withdrawn from settler 39 and passed by way of conduit 43 into coalescer 44 wherein a second separation of the catalyst complex is made, and the catalyst complex thus recovered is returned to settler 39 by way of line 45. The substantially catalyst-free reaction effluent is withdrawn from coalescer 44 and passed by way of line 46 into surge tank 47, which is vented through an absorber to remove small quantities of light hydrocarbons from the system. The remaining material is charged from surge tank 47 through line 48 into stripper 49 to separate out hydrogen chloride which is then withdrawn from stripper 49 and passed by way of lines 38 and 27 into reactor 28. The remaining hydrocarbon material is withdrawn from stripper 49 by way of line 51 and passed to further processing (not shown) to separate and recover various hydrocarbons present therein.

The concentration of catalyst in the complex which is recycled by way of line 35 is determined by means of an analytical device 52 such as a viscometer, the output of which is applied to an input of catalyst concentration controller 53 and is therein compared with a set point representing the desired concentration of catalyst in the catalyst complex recycle stream. Controller 53 transmits to refortification rate controller 54 an output representative of the amount of catalyst to be added by means of the hydrocarbon feed to the circulating catalyst complex in the reactor-settler system. As the amount of catalyst which goes into solution with the hydrocarbon feed is dependent upon both the temperature and flow rate of the feed contacting the catalyst in the refortification chamber 16, the addition rate can be controlled by maintaining the flow rate of hydrocarbon feed to the refortification column substantially constant at a predetermined value or at a predetermined ratio to the flow rate through line 19 while varying the temperature of the hydrocarbon feed going to the refortification column responsive to the desired refortification rate; by maintaining the temperature of the hydrocarbon feed going to the refortification column substantially constant while manipulating the flow rate of the hydrocarbon feed going to the refortification column responsive to the desired refortification rate; or by manipulating both flow rate and temperature of the hydrocarbon feed going to the refortification column, either simultaneously or in split ranges, responsive to the desired refortification rate.

The flow rate of hydrocarbon feed to the refortification column 16 through lines 12 and 15 is regulated by flow rate recorder controller 55 which manipulates valve 13 responsive to a comparison of the output of differential pressure transmitter 56 located across orifice 57 in line 12 and a set point signal from controller 54. A signal representative of the differential pressure across orifice 57 is transmitted to controller 54. The rate of flow through line 19 is regulated by flow rate recorder controller 58 manipulating valve 23 responsive to the output of differential pressure transmitter 59 located across orifice 61 in line 19. The temperature of the catalyst-containing solution in line 26 is controlled by means of temperature recorder controller 62 which manipulates the heat transferred to the hydrocarbon feed passing through heating unit 14 responsive to a comparison of the actual temperature of the catalyst solution as determined by temperature sensing device 63 to a set point signal from controller 54 representative of the desired temperature of the catalyst solution. Heating unit 14 can be any suitable device, such as a furnace, an indirect heat exchanger, and the like. A continuous sample of the catalyst-containing solution is withdrawn from line 26 and passed by way of line 64 into one inlet of refractometer 65, the output of which is representative of the concentration of catalyst in the solution in line 26 and is transmitted to controller 54 as an input signal thereto. If changes in the composition of the hydrocarbon feed adversely affect the refractive index difference, corresponding to a certain catalyst concentration, thereby impairing the specificity of analysis, refractometer 65 can be a differential refractometer with a continuous sample of hydrocarbon feed being withdrawn from line 15 and passed by way of line 66 into a second inlet of refractometer 65.

Thus the amount of catalyst which enters into solution with the hydrocarbon feed being passed through the refortification unit in the system of FIGURE 1 can be defined as:

$$E_A = f(E_R, E_T, E_F, E_D, F_{TD}, F_A, F_{AD}, F_{BD}, P_A, P_{AS}, P_B, P_{BS}, T_A, T_S, T_D, \rho, A, B, C_A, C_B, k)$$

where:

$E_A$ = actual concentration of catalyst in solution of catalyst and hydrocarbon feed leaving the refortification zone, $E_R$ = actual concentration of catalyst in catalyst complex recycle stream, $E_T$ = desired concentration of catalyst in catalyst complex recycle stream, $E_F$ = required concentration of catalyst in total hydrocarbon feed, $E_D$ = required concentration of catalyst in solution of catalyst and hydrocarbon feed leaving the refortification zone, $F_{TD}$ = desired total flow of hydrocarbon feed, $F_A$ = actual flow of hydrocarbon feed to refortification zone, $F_{AD}$ = desired flow of hydrocarbon feed to refortification zone, $F_{BD}$ = desired flow of hydrocarbon feed which is bypassed around refortification zone, $P_A$ = output signal of pressure differential flow meter associated with the hydrocarbon feed stream to the refortification zone, $P_{AS}$ = set point signal to flow recorder controller associated with the hydrocarbon feed stream to the refortification zone, $P_B$ = output signal of pressure differential flow meter associated with hydrocarbon feed being bypassed around refortification zone, $P_{BS}$ = set point signal to flow recorder controller associated with the hydrocarbon feed stream being bypassed around refortification zone, $T_A$ = actual temperature of mixture of hydrocarbon feed and catalyst in the refortification zone, $T_D$ = desired temperature of mixture of hydrocarbon feed and catalyst in the refortification zone, $T_S$ = set point signal to temperature controller regulating addition of heat to the hydrocarbon feed stream being passed to the refortification zone, $\rho$ = density of hydrocarbon feed, $A$ and $B$ = solubility constants of the catalyst in the hydrocarbon feed, $C_A$ = flow proportionality constant for the flow recorder controller associated with the hydrocarbon feed stream to the refortification zone, $C_B$ = flow proportionality constant for the flow recorder controller associated with the hydrocarbon feed stream being bypassed around the refortification zone, $k$ = temperature proportionality constant.

Input constants $C_B$, $C_A$, $F_{TD}$, $\rho$, $A$, $B$ and $k$ are applied to controller 54 by way of lines 71–78, respectively.

Referring now to FIGURE 2, there is set forth an embodiment of refortification rate controller 54 which maintains the flow rate of hydrocarbon feed to the refortification column 16 substantially constant while manipulating the rate of addition of heat to the hydrocarbon feed going to the refortification column 16 responsive to the concentration of catalyst in the catalyst complex recycle stream in line 35. The input signal representation of the desired hydrocarbon flow for refortification $F_{AD}$ is divided in divider 79 by the signal represenative of $C_A$ and the resulting quotient is squared in squaring means 81 to obtain a signal represenative of $P_{AS}$ which is applied to the set point input of flow recorder controller 55. The output $P_A$ of differential pressure transmitter 56 is applied to the measurement input of flow recorder controller 55 wherein an output signal representative of the difference between $P_{AD}$ and $P_A$ is produced and applied to valve 13 to maintain the rate of flow therethrough at a substantially constant rate. The output $P_A$ of differential pressure transmitter 56 is also transmitted by way of line 82 to controller 54 wherein the square root thereof is obtained in square root extractor 83 and multiplied by $C_A$ in multiplier 84 to obtain a signal representative of $F_A$. Subtractor 85 performs the subtraction of $F_A$ from $F_{TD}$ to obtain a signal representative of $F_{BD}$ which is then divided by a signal representative of $C_B$ in divider 86 with the resulting quotient being squared by squaring means 87 to obtain $P_{BS}$. The signal representative of $P_{BS}$ is applied to the set point input of flow recorder controller 58 wherein it is compared with the output signal $P_B$ of differential pressure transmitter 59. The output of controller 58 is applied to valve 23 to maintain the rate of flow therethrough at a substantially constant rate. It is within the contemplation of the invention to apply the respective set points directly to flow recorder controllers 55 and 58 without requiring the computing equipment of controller 54; however, the flow control system illustrated in FIGURE 2 is presently preferred due to the ease and centralization of total feed flow rate control. It is also within the contemplation of the invention to maintain the ratio of the flow rate through line 12 to the flow rate through line 19 substantially constant through the utilization of a ratio controller having $P_A$ and $P_B$ as inputs.

Viscometer 52 (FIGURE 1) produces an output signal representative of $E_R$ which is applied to an input of controller 53 wherein it is compared with a set point signal representative of $E_T$ in light of catalyst complex inventory $I_A$. Controller 53 produces an output signal representative of $E_F$ which is applied by way of line 88 to an input of multiplier 89. A signal representative of the ratio of $F_{TD}$ to $F_A$ is obtained in divider 91 and applied to the second input of multiplier 89 to obtain the product $E_D$.

Refractometer 65 produces an output signal which is representative of $E_A$ which is transmitted by way of line 92 to controller 54. The signal representative of $E_A$ is applied to subtractor 93 where it is subtracted from $E_D$ to obtain $\Delta E$, $\Delta E$ being representative of the difference between the actual and the desired concentration of catalyst in the solution of catalyst and hydrocarbon feed in line 26.

Temperature transmitter 63 produces an output signal representative of $T_A$ which is transmitted by way of line 94 to controller 54 wherein it is applied to one input of multiplier 95. The signal representative of $T_A$ is multiplied in multiplier 95 by temperature proportionally constant $k$ to obtain a signal representative of $T$, where $T$ is a signal representative of $T_A$ but having been scaled for use in controller 54. As the temperature change, $\Delta T$, required to effect the desired change in catalyst concentration ($\Delta E$) is a function of $E_A \cdot B/T^2$, the signals representative of $B$ and $T$ are applied to divider 96 to obtain $B/T$ which is then applied to divider 97 and therein divided by a signal representative of $T$ to obtain $B/T^2$, and the signals representative of $E_A$ and $B/T^2$ are applied to the inputs of multiplier 98 to obtain the product $E_A B/T^2$ which is then applied to divider 99. The signal representative of $\Delta E$ is applied to the input of divider 99 and therein divided by the product $E_A B/T^2$ to obtain a signal representative of $\Delta T$. The signals representative of $T$ and $\Delta T$ are applied to a summer 101 to obtain a signal representative of $T_D$ which is divided by $k$ in divider 102 to obtain a signal representative of $T_S$. The signal representative of $T_S$ is applied by way of line 103 to the set point input of temperature recorder controller 62. The signal $T_A$ from temperature sensing device 63 and the signal $T_S$ from controller 54 are compared in temperature recorder controller 62 to produce an output signal which is transmitted by way of line 104 to valve 105 (FIGURE 1) to control the rate of addition of heat to the hydrocarbon feed passing through heater 14. It is within the contemplation of the invention to determine $T_A$ by measuring the temperature of the hydrocarbon feed in line 15 or by measuring the temperature at a point within refortification column 16.

In the presently preferred embodiment it is desired that the ratio of $E_A$ to $E_S$ be obtained as a means of indicating the performance of the control system. The saturated concentration in pounds of catalyst per volume of hydrocarbon, $E_S$, can be defined by the expression $$E_S = \rho e^{A - \frac{B}{T}}$$

The output of divider 96, which is representative of $B/T$, is applied to subtractor 106 wherein it is subtracted from a signal representative of $A$. The output of subtractor 06 is applied to the input of antilogarithm generating device 107 to obtain $$e^{A-\frac{B}{T}}$$

which is then applied to an input of multiplier 108 wherein it is multiplied by a signal representative of $\rho$ to obtain a signal representative of $E_S$. The signals representative of $E_A$ and $E_S$ are applied as inputs to divider 09 to obtain the ratio of $E_A/E_S$ which is then applied to indicating means 111. If desired, alarm mechanism 12 can be connected to indicating means 111 to sound an alarm in the event that the value of the ratio exceeds a predetermined value, for example 0.98, or drops below a predetermined minimum value, for example 0.2.

Referring now to FIGURE 3 there is set forth an embodiment of refortification rate controller 54 which maintains the temperature of the mixture of hydrocarbon feed and catalyst in the refortification column 16 substantially constant while manipulating the flow rate of hydrocarbon feed to the refortification column 16 responsive to the concentration of catalyst in catalyst recycle stream in line 35. The input signal representative of $T_D$ is divided by the signal representative of $k$ in divider 113 to obtain the signal representative of $T_S$ which is then applied by way of line 103 to the set point input of temperature recorder controller 62. Temperature recorder controller 62 compares the signal representative of $T_S$ and the output signal $T_A$ from temperature sensing device 63 and produces an output signal which is transmitted by way of line 104 to valve 105 to regulate the transfer of heat to the hydrocarbon feed going to the refortification column 16 to maintain the temperature of the mixture in line 26 substantially constant.

The output $P_A$ of differential pressure transmitter 56 is transmitted by way of line 82 to controller 54 wherein the square root thereof is obtained in square root extractor 114 and multiplied by a signal representative of $C_A$ in multiplier 115 to obtain a signal representative of $F_A$. Signals representative of $F_{TD}$ and $F_A$ are applied to divider 116 to obtain the ratio of $F_{TD}/F_A$ which is then multiplied by a signal representative of $E_F$ in multiplier 117 to obtain a signal representative of $E_D$. The signal representative of $E_D$ is applied to a first input of algebraic subtractor 118 while the signal representative of $E_A$ is applied by way of line 92 to a second input of algebraic subtractor 118 and therein subtracted from the signal representative of $E_D$ to obtain a signal representative of $\Delta E$. Signals representative of $E_D$ and $F_A$ are applied to first and second inputs of divider 119 to obtain the ratio of $F_A/E_D$ which is then multiplied in multiplier 121 by the signal representative of $\Delta E$ to obtain a signal representative of $\Delta F$. Signals representative of $\Delta F$ and $F_A$ are applied to first and second inputs of summer 122 to obtain a signal representative of $F_{AD}$. The signal representative of $F_{AD}$ is divided by a signal representative of $C_A$ in divider 123 and the resulting quotient squared in squaring means 124 to obtain a signal representative of $P_{AS}$. The signal representative of $P_{AS}$ is applied to the set point input of flow recorder controller 55 wherein it is compared with the signal $P_A$ from differential pressure transmitter 56 to produce an output signal which is transmitted to valve 13 to regulate the flow of hydrocarbon feed therethrough. A signal representative of $F_{AD}$ is applied to subtractor 125 wherein it is subtracted from the signal representative of $F_{TD}$ to obtain a signal representative of $F_{BD}$. The signal representative of $F_{BD}$ is divided by the signal representative of $C_B$ in divider 126 and the resulting quotient is squared in squaring means 127 to produce a signal representative of $P_{BS}$. The signal of $P_{BS}$ is applied to the set point input of flow recorder controller 58 wherein it is compared with the output signal $P_B$ from differential pressure transmitter 59, the output of flow recorder controller 58 being applied to valve 23 to regulate the rate of flow of hydrocarbon feed therethrough.

Signals representative of $k$ and $T_A$ are multiplied in multiplier 128 to obtain a signal representative of $T$ which is then divided in divider 129 by a signal representative of B to obtain the signal $B/T$. The signal $B/T$ and the signal representative of A are applied to subtractor 131 to obtain $A-B/T$ which is then applied to antilogarithm generating device 132 to obtain $$e^{A-\frac{B}{T}}$$

The function $$e^{A-\frac{B}{T}}$$

is multiplied by $\rho$ in multiplier 133 and then divided into the signal representative of $E_A$ in divider 134 to obtain the ratio of $E_A$ to $E_S$ which is applied to indicating means 111 and alarm 112.

While the refortification zone has been illustrated as utilizing a refortification column 16, it is within the contemplation of the invention to utilize a plurality of refortification columns with at least one column being on stream and at least one column being recharged with catalyst. It is also within the contemplation of the invention to add catalyst to the refortification column periodically or in a continuous manner. While the catalyst concentration analyzers have been disclosed in terms of viscometer 52 and refractometer 65, it is within the contemplation of the invention to utilize any suitable instrument for determining catalyst concentration, such as, for example, gravitometers, hydrolysis calorimeters, and automatic titrators. The catalyst concentration analyzers are preferably compensated for variations in sample temperature even in those instances where the temperature remains substantially constant, and this can be done either in the analyzer or in the provision of suitable equipment in controller 54. It is also within the contemplation of the invention to combine the embodiments of controller 54 illustrated in FIGURES 2 and 3 into a single controller to provide a more versatile control system and, if desired, to use both embodiments simultaneously. While the invention has been illustrated with analyzer 65 associated with line 26, it is also within the contemplation of the invention to utilize analyzer 65 in association with line 25 to thereby determine the concentration of catalyst in the total hydrocarbon feed. In such a case the output of the analyzer on the total hydrocarbon feed stream could be multiplied by a signal representative of $F_{TD}/F_A$ to obtain the $E_A$ input to controller 54.

Since there is a delay in response between changes of concentration made in the effluent from refortification column 16 and changes resulting therefrom in the concentration of catalyst in the catalyst complex recycle stream in line 35 as measured by viscometer 52, controller 53 can be operated to institute small incremental changes over time periods commensurate with this delay in response. For example, if viscometer 52 detects a value below the desired concentration, it will decrease the signal to controller 53 an additional incremental amount and maintain this setting for a period of time sufficient for the concentration of catalyst in line 35 to respond thereto. After this period of time, a further adjustment can be made, and so on. However, a preferred method of accounting for the time delay is set forth in the article "The Application of Dead-Time Compensation to a Chemical Reactor for Automatic Control of Production Rate," by D. E. Lupfer and M. W. Oglesby in ISA Transactions, volume 1, No. 1, pages 72–80, January 1962. Dead time between a change in an input to controller 54 and the resulting change in catalyst concentration in line 26 can be accounted for in a similar manner.

While the invention has been described in terms of the isomerization of normal hexane and methylcyclopentane, it is applicable to the isomerization of other materials.

The invention is also applicable to an alkylation process. The reaction of alkylating agents such as olefins and alkyl halides with an isoparaffinic hydrocarbon in the presence of a metal halide is well known, for example, the alkylation of isobutane with ethylene in the presence of aluminum chloride-hydrocarbon complex catalyst promoted by hydrogen chloride.

The following example is presented in further illustration of the invention and is not to be unduly construed in limitation thereof.

EXAMPLE

In a process system similar to that shown in FIGURE 1 a hydrocarbon feed comprising primarily normal hexane and methylcyclopentane is converted to an effluent stream comprising product isohexanes and cyclohexane together with unreacted normal hexane and methylcyclopentane by contact with a catalyst system comprising hydrogen chloride and an aluminum chloride-hydrocarbon complex. A catalyst complex inventory of 70,000 lbs. resides in the reactor-settler system 28, 39 and its aluminum chloride content is controlled by the rate of addition of fresh catalyst to the hydrocarbon feed. The hydrocarbon feed rate through line 11 is 6000 gal./hr., of which 2000 gal./hr. flows through line 12 and heater 14 into refortification column 16. The temperature of the hydrocarbon feed entering refortification column 16 is 155° F., and the resulting concentration of aluminum chloride in the solution in line 26 is 13.5 lbs. of aluminum chloride per 1000 gallons of hydrocarbon feed. This additional rate compensates for the normal catalyst losses by way of line 46 of 27 lbs. of aluminum chloride per hour.

*Constant flow, varying temperature control system*

The concentration of aluminum chloride in the catalyst complex in line 35 drops from the desired value of 60.0 weight percent to 59.9 weight percent, requiring an addition of 175 lbs. of aluminum chloride to regain the desired value. While the control system of FIGURE 1 operates in a time-varying fashion, its operation is more readily explained by assuming that the concentration change occurred in a stepwise fashion.

Controller 53 thereby instructs addition rate controller 54 of FIGURE 2 to add aluminum chloride to the total hydrocarbon feed at a rate of 120 lbs./hr. A new temperature set point of 220° F. is computed in controller 54 by the mathematical relations of addition rate to concentration to temperature and is transmitted and applied to temperature controller 62. When a temperature of 220° F. is achieved in refortification column 16, the rate of aluminum chloride addition rises to approximately 120 lbs./hr. or 93 lbs./hr. over normal losses. After about 1.9 hours, the concentration of aluminum chloride in the catalyst complex returns to the desired value of 60.0 weight percent and the temperature set point is returned to 155° F. to provide for the addition of the 27 lbs. of aluminum chloride per hour required to compensate for the normal catalyst losses.

Similar control system behavior occurs when the desired catalyst concentration set point $E_T$ is adjusted in view of changing process operational considerations.

*Varying flow, constant temperature control system*

Due to changes in the reaction and settling steps of the process, the normal catalyst losses increase from 27 to 30 lbs./hr. of aluminum chloride. As a result of this change, aluminum chloride concentration in stream 35 declines. With the refortification temperature remaining constant at 155° F., the flow rate of hydrocarbon feed through line 12 must be increased to obtain the desired catalyst addition rate. Controller 54 of FIGURE 3 computes a new flow rate of 2220 gal./hr. which is transmitted to flow controller 55, while decreasing the set point of flow controller 58 from 4000 to 3780 gal./hr. The aluminum chloride addition rate is thus raised to 30 lbs./hr. thereby compensating for the increased catalyst losses.

Reasonable variations and modifications are possible within the scope of the foregoing disclosure, the drawing and the appended claims to the invention.

I claim:

1. In a hydrocarbon conversion process wherein a reactive, liquid hydrocarbon is admixed with a conversion catalyst and the resulting mixture is introduced into a conversion reaction zone, said conversion catalyst being a solid which is partially soluble in said reactive, liquid hydrocarbon, the reaction effluent is withdrawn from said reaction zone, the catalyst contained in the thus withdrawn reaction effluent is recovered and returned to said reaction zone in a catalyst complex recycle stream; the improvement comprising dividing said reactive, liquid hydrocarbon into a first stream and a second stream; passing said second stream through a first heat exchanging zone into a refortification zone containing said conversion catalyst; withdrawing from said refortification zone a third stream comprising said second stream containing a portion of said conversion catalyst dissolved therein; passing said first stream through a second heat exchanging zone and therein cooling said first stream; combining said third stream and the thus cooled first stream to form a fourth stream; passing said fourth stream into said reaction zone as the source of said mixture, controlling the rate of flow of said second stream substantially constant; sensing the temperature of said third stream as it leaves said refortification zone and producing a first signal representative of the thus sensed temperature; determining the concentration of catalyst in said third stream and establishing a second signal representative of the thus determined concentration; producing a third signal representative of the desired concentration of catalyst in said third stream; producing responsive to said second and third signals a fourth signal representative of the change in temperature of said third stream required to achieve the desired concentration of catalyst in said third stream; producing responsive to said first and fourth signals a fifth signal representative of the sum of said first and fourth signals; and manipulating the rate of transfer of heat to said second stream in said first heat exchanging zone responsive to said fifth signal to maintain the actual concentration of catalyst in said third stream substantially equal to said desired concentration.

2. A process in accordance with claim 1 further comprising determining the concentration of catalyst in said catalyst complex recycle stream and establishing a sixth signal representative of the thus determined concentration of catalyst in said catalyst complex recycle stream, and varying said third signal as a function of said sixth signal.

3. In a hydrocarbon conversion process wherein a reactive, liquid hydrocarbon is admixed with a conversion catalyst and the resulting mixture is introduced into a conversion reaction zone, said catalyst being a solid which is partially soluble in said reactive, liquid hydrocarbon, the reaction effluent is withdrawn from said reaction zone, the catalyst contained in the thus withdrawn reaction effluent is recovered and returned to said reaction zone in a catalyst complex recycle stream, the improvement comprising dividing said reactive, liquid hydrocarbon into a first stream and a second stream, passing said second stream through a first heat exchanging zone into a refortification zone containing said conversion catalyst, withdrawing from said refortification zone a third stream comprising said second stream containing a portion of said conversion catalyst dissolved therein, passing said first stream through a second heat exchanging zone and therein cooling said first stream, combining said third stream and the thus cooled first stream to form a fourth stream, passing said fourth stream into said reaction zone as the source of said mixture of reactive hydrocarbon and conversion catalyst, sensing the temperature of said third stream as it leaves said refortification zone and producing a first signal representative of the thus sensed temperature, controlling the rate of transfer of heat to said second stream in said st heat exchanging zone responsive to said first signal thereby maintain the temperature of said third stream it leaves said refortification zone substantially constant, determining the concentration of catalyst in said fourth stream and establishing a second signal representative of the thus determined concentration, establishing a third signal ($E_F$) representative of the desired concentration of said conversion catalyst in said fourth stream, establishing a fourth signal ($F_{TD}$) representative of the desired total flow rate of hydrocarbon feed, sensing the actual flow rate of said second stream and establishing a fifth signal ($F_A$) representative thereof, establishing responsive to said second, third, and fourth signals a sixth signal ($F_{AD}$) representative of the flow rate of said second stream which is required to achieve the desired concentration of said conversion catalyst in said fourth stream, manipulating the rate of flow of said second stream responsive to said fifth and sixth signals to thereby control the concentration of catalyst in said fourth stream, and manipulating responsive to said fourth and fifth signals the flow rate of said first stream to maintain the total of the flow rates of said first and second streams substantially equal to said desired total flow rate of hydrocarbon feed.

4. A process in accordance with claim 3 wherein the amount of the catalyst complex recycle stream remains substantially constant, further comprising determining the concentration of catalyst in said catalyst complex recycle stream and establishing a seventh signal ($E_R$) representative thereof, and varying said third signal ($E_F$) as a function of said seventh signal.

5. A process in accordance with claim 3 further comprising determining the temperature of said fourth stream and establishing a seventh signal representative thereof, and manipulating the rate of cooling said first stream in said second heat exchanging zone responsive to said seventh signal.

6. In an isomerization process wherein a liquid feed stream comprising normally acyclic hydrocarbon and an alkyl substituted alicyclic hydocarbon is admixed with a metal halide isomerization catalyst and the resulting mixture is introduced into an isomerization reaction zone which is maintained at a temperature in the range of about 90° F. to about 160° F. and at a pressure in the range of 150 to about 300 p.s.i.g, the reaction effluent is withdrawn from said isomerization reaction zone, the catalyst contained in the thus withdrawn reaction effluent is recovered and returned to said reaction zone as a catalyst complex recycle stream said catalyst being a solid which is partially soluble in solid liquid feed stream, the improvement comprising dividing said feed stream into a first stream and a second stream, passing said second stream through a first heat exchanging zone into a refortification zone containing said metal halide isomerization catalyst, withdrawing from said refortification zone a third stream comprising said second stream containing a portion of said isomerization catalyst dissolved therein, combining said first stream and said third stream to obtain a fourth stream, passing said fourth stream into said reaction zone as a source of said mixture, determining the concentration of isomerization catalyst in one of said third and fourth streams and establishing a first signal representative thereof, establishing a second signal representative of the desired total flow rate of said feed stream, establishing a third signal representative of the actual flow rate of said second stream, establishing a fourth signal representative of the temperature of said third stream, establishing a fifth signal representative of the desired concentration of said catalyst in said fourth stream, maintaining the flow rate of said second stream substantially constant, and manipulating responsive to said first, second, third, fourth and fifth signals the heat input to said second stream in said first heat exchanging zone to thereby control the concentration of said catalyst in said fourth stream.

7. In an isomerization process wherein a liquid feed stream comprising normally acyclic hydrocarbon and an alkyl substituted alicyclic hydrocarbon is admixed with a metal halide isomerization catalyst and the resulting mixture is introduced into an isomerization reaction zone which is maintained at a temperature in the range of about 90° F. to about 160° F. and at a pressure in the range of 150 to about 300 p.s.i.g., the reaction effluent is withdrawn from said isomerization reaction zone, the catalyst contained in the thus withdrawn reaction effluent is recovered and returned to said reaction zone as a catalyst complex recycle stream, said catalyst being a solid which is partially soluble in said liquid feed stream, the improvement comprising dividing said feed stream into a first stream and a second stream, passing said second stream through a first heat exchanging zone into a refortification zone containing said metal halide isomerization catalyst, withdrawing from said refortification zone a third stream comprising said second stream containing a portion of said isomerization catalyst dissolved therein, combining said first stream and said third stream to obtain a fourth stream, passing said fourth stream into said reaction zone as a source of said mixture, determining the concentration of isomerization catalyst in said fourth stream and establishing a first signal representative thereof, establishing a second signal representative of the desired total flow rate of said feed stream, establishing a third signal representative of the actual flow rate of said second stream, establishing a fourth signal representative of the temperature of said third stream, establishing a fifth signal representative of the desired concentration of said catalyst in said fourth stream, manipulating responsive to said fourth signal the heat input to said second stream in said first heat exchanging zone to maintain the temperature of said third stream substantially constant, manipulating responsive to said first, second, third and fifth signals said actual flow rate of said second stream to thereby control the concentration of said catalyst in said fourth stream and manipulating responsive to said second and third signals the flow rate of said first stream to thereby control the total of the flow rates of said first and second streams substantially equal to said desired total flow rate of said feed stream.

References Cited by the Examiner

UNITED STATES PATENTS

| | | | |
|---|---|---|---|
| 2,786,086 | 3/1957 | Gitterman | 260—683.7 |
| 2,917,437 | 12/1959 | Kleiss et al. | 202—160 |
| 2,988,894 | 6/1961 | Van Pool et al. | 202—160 |
| 2,990,437 | 6/1961 | Berger | 196—132 |
| 2,992,976 | 7/1961 | Cottle | 196—132 |
| 2,994,646 | 8/1961 | Kleiss | 202—160 |
| 3,002,818 | 10/1961 | Berger | 196—132 |
| 3,029,829 | 4/1962 | Glueck | 137—89 |
| 3,108,929 | 10/1963 | Tolin et al. | 202—160 |
| 3,192,285 | 6/1965 | Martin | 260—683.75 |

DELBERT E. GANTZ, *Primary Examiner.*

JOSEPH R. LIBERMAN, *Examiner.*

C. R. DAVIS, R. H. SHUBERT, *Assistant Examiners.*